(12) United States Patent
Melakari et al.

(10) Patent No.: US 12,105,363 B2
(45) Date of Patent: Oct. 1, 2024

(54) ACTIVELY ADAPTIVE OPTICAL APPARATUSES FOR REDUCING MYOPIA DEVELOPMENT

(71) Applicant: Pixieray Oy, Espoo (FI)

(72) Inventors: Klaus Melakari, Espoo (FI); Rebecca Qing Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 17/670,023

(22) Filed: Feb. 11, 2022

(65) Prior Publication Data

US 2023/0258960 A1 Aug. 17, 2023

(51) Int. Cl.
*G02C 7/08* (2006.01)
*G02B 27/00* (2006.01)
*G02F 1/29* (2006.01)

(52) U.S. Cl.
CPC ......... *G02C 7/083* (2013.01); *G02B 27/0093* (2013.01); *G02F 1/294* (2021.01); *G02C 2202/24* (2013.01)

(58) Field of Classification Search
CPC ............... G02B 27/0093; G02C 7/083; G02C 2202/24; G02F 1/294
See application file for complete search history.

(56) References Cited

U.S. PATENT DOCUMENTS

| | | |
|---|---|---|
| 11,567,326 B1 * | 1/2023 | Jamali ............... G02F 1/134309 |
| 2014/0085726 A1 | 3/2014 | Portney |
| 2014/0092327 A1 * | 4/2014 | Machida ............... G02C 7/083 |
| | | 349/13 |

(Continued)

FOREIGN PATENT DOCUMENTS

| | | |
|---|---|---|
| GB | 2584546 A | 12/2020 |
| KR | 20200131633 A | 11/2020 |

(Continued)

OTHER PUBLICATIONS

European Patent Office, Notification of Transmittal of the International Seach Report and the Written Opinion of the International Searching Authority, or the Declaration, International Application No. PCT/FI2022/050755, Date of Mailing: Mar. 1, 2023, 14 pages.

(Continued)

*Primary Examiner* — Jessica M Merlin
(74) *Attorney, Agent, or Firm* — Ziegler IP Law Group LLC.

(57) ABSTRACT

An optical apparatus includes means for determining an optical depth at which a user is looking, an active optical element per eye, controlling means for controlling an active material in the active optical element to generate one or more optical powers, and a processor. The processor is configured to process data, collected by the means for determining, to determine the optical depth at which the user is looking; detect when the optical depth at which the user is looking is greater than a predefined optical depth; and when it is detected that the optical depth is greater than the predefined optical depth, generate a drive signal to drive the controlling means to control the active material in a portion of the active optical element to produce a predefined optical power thereat, wherein the predefined optical power is a negative optical power.

28 Claims, 7 Drawing Sheets

(56) References Cited

U.S. PATENT DOCUMENTS

2022/0187625 A1* 6/2022 Yam .................. A61H 5/00

FOREIGN PATENT DOCUMENTS

| WO | 2014049577 A1 | 4/2014 |
| WO | WO-2018184072 A1 * | 10/2018 |
| WO | 2020219518 A1 | 10/2020 |
| WO | 2020245680 A1 | 12/2020 |

OTHER PUBLICATIONS

European Patent Office, Written Opinion of the International Examining Authority, Application No. PCT/FI2022/050755, mailed Dec. 14, 2023, 7 pages.

* cited by examiner

ACTIVELY ADAPTIVE OPTICAL APPARATUSES FOR REDUCING MYOPIA DEVELOPMENT

TECHNICAL FIELD

The present disclosure relates to optical apparatuses for reducing myopia development. Moreover, the present disclosure relates to methods for manufacturing such optical apparatuses.

BACKGROUND

Prescription lenses having fixed negative optical powers are widely used for myopia correction (namely, distance vision). In such prescription lenses for myopia correction, a fixed negative optical power is provided in an entirety of a lens. A problem with such prescription lenses is that the fixed negative optical power is provided continuously. In other words, there is no provision for discontinuing the fixed negative optical power when a user's eye needs to focus on objects in close proximity. As a result, an eye lens of the user is required to generate many dioptres to first overcome the negative optical power and then generate close focus to see clearly the objects in close proximity. This expedites myopia development in the user. This problem is more pronounced in children, because their eyes continue to grow during childhood, and conventional prescription lenses for myopia correction (with fixed negative optical powers) cause further myopia development.

Some conventional optical apparatuses employ techniques like Defocus Incorporated Multiple Segments (DIMS) and Highly Aspherical Lenslet Target (HALT) technology, in an attempt to reduce myopia development. An optical element of such an optical apparatus acts much like a single vision lens for myopia correction, but with an overlaying zone for myopia control. Said overlaying zone is made of lenslets with spaces therebetween. These lenslets create a differential myopic defocus across a retina of the user.

However, these techniques suffer from some disadvantages. Firstly, in such an optical apparatus, various portions of the optical apparatus produce fixed optical powers, and do not accommodate to a moving eye of a user. Instead, the user's eyes are required to over-accommodate. Secondly, as an undisturbed field of view provided in such an optical apparatus is very small, there is a high likelihood of misplacement of the optical apparatus with respect to the user's eye. Therefore, such an optical apparatus needs to be fit properly, in order to ensure that the user's eye is able to use the optical apparatus comfortably. Thirdly, the lenslets in the overlaying zone work by creating defocus, and therefore, provide only a limited field of view in between for vision correction.

Therefore, in light of the foregoing discussion, there exists a need to overcome the aforementioned challenges associated with conventional optical apparatuses.

SUMMARY

The present disclosure seeks to provide an improved optical apparatus for reducing myopia development. Moreover, the present disclosure seeks to provide a method for manufacturing an optical apparatus for reducing myopia development. Furthermore, the present disclosure also seeks to provide a solution to the existing problems of conventional optical apparatuses.

In a first aspect, an embodiment of the present disclosure provides an optical apparatus for reducing myopia development, comprising:
  means for determining an optical depth at which a user is looking;
  an active optical element per eye, comprising an active material encased between at least a first substrate and a second substrate, the first substrate and the second substrate being optically transparent;
  controlling means for controlling the active material in the active optical element to generate one or more optical powers; and
  a processor configured to:
    process data, collected by the means for determining, to determine the optical depth at which the user is looking;
    detect when the optical depth at which the user is looking is greater than a predefined optical depth; and
    when it is detected that the optical depth is greater than the predefined optical depth, generate a drive signal to drive the controlling means to control the active material in a portion of the active optical element to produce a predefined optical power thereat, wherein the predefined optical power is a negative optical power.

In a second aspect, an embodiment of the present disclosure provides a method for manufacturing an optical apparatus, the method comprising:
  employing means for determining an optical depth at which a user is looking;
  employing an active optical element formed by encasing an active material between at least a first substrate and a second substrate, the first substrate and the second substrate being optically transparent;
  employing controlling means for controlling the active material in the active optical element to generate one or more optical powers; and
  configuring a processor to:
    process data, collected by the means for determining, to determine the optical depth at which the user is looking;
    detect when the optical depth at which the user is looking is greater than a predefined optical depth; and
    when it is detected that the optical depth is greater than the predefined optical depth, generate a drive signal to drive the controlling means to control the active material in a portion of the active optical element to produce a predefined optical power thereat, wherein the predefined optical power is a negative optical power.

Embodiments of the present disclosure substantially eliminate, or at least partially address the aforementioned problems in the prior art, allow to selectively assist focus creation for distance vision only when it is actually needed and in real time or near real time, and effectively reduces myopia development.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
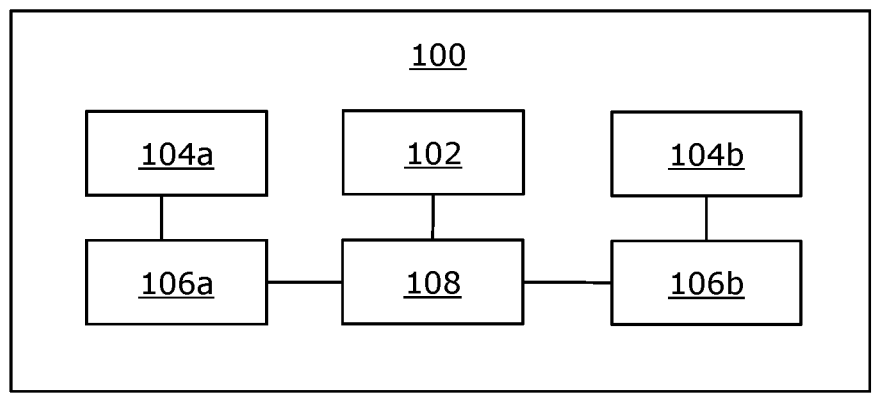
FIG. 1 is a schematic diagram of an optical apparatus for reducing myopia development, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an optical apparatus for reducing myopia development, comprising:

means for determining an optical depth at which a user is looking;

an active optical element per eye, comprising an active material encased between at least a first substrate and a second substrate, the first substrate and the second substrate being optically transparent;

controlling means for controlling the active material in the active optical element to generate one or more optical powers; and a processor configured to:

process data, collected by the means for determining, to determine the optical depth at which the user is looking;

detect when the optical depth at which the user is looking is greater than a predefined optical depth; and when it is detected that the optical depth is greater than the predefined optical depth, generate a drive signal to drive the controlling means to control the active material in a portion of the active optical element to produce a predefined optical power thereat, wherein the predefined optical power is a negative optical power.

In a second aspect, an embodiment of the present disclosure provides a method for manufacturing an optical apparatus, the method comprising:

employing means for determining an optical depth at which a user is looking;

employing an active optical element formed by encasing an active material between at least a first substrate and a second substrate, the first substrate and the second substrate being optically transparent;

employing controlling means for controlling the active material in the active optical element to generate one or more optical powers; and configuring a processor to:

process data, collected by the means for determining, to determine the optical depth at which the user is looking;

detect when the optical depth at which the user is looking is greater than a predefined optical depth; and when it is detected that the optical depth is greater than the predefined optical depth, generate a drive signal to drive the controlling means to control the active material in a portion of the active optical element to produce a predefined optical power thereat, wherein the predefined optical power is a negative optical power.

Pursuant to embodiments of the present disclosure, the negative optical power (namely, the predefined optical power) is produced only when the optical depth at which the user is looking is greater than the predefined optical depth. This allows to selectively assist focus creation for distance vision only when it is actually needed and in real time or near real time. Thus, myopia correction (by producing the negative optical power) is only provided in a case when a user is looking at an object that is too far for her/his eyes to focus clearly.

The aforementioned optical apparatus is particularly susceptible for use in children, because myopia development largely influences children, as their eyes continue to grow during childhood. In an example implementation, the optical apparatus can be implemented as therapeutic glasses for children, such that the myopia correction is activated (namely, turned on to produce the negative optical power) only when a child needs to view faraway objects. This allows a base vision of the child to be retained, and promotes a healthy development of a myopic eye to correct itself during a growth phase. However, the optical apparatus can also be used by adults. Pursuant to embodiments, when a user reads or looks at objects in close proximity, myopia correction is turned off (that is, the negative optical power is not produced in the active optical element). As a result, the user's eyes do not need to focus as many dioptres (of the negative optical power) when reading or looking at the objects in close proximity.

Moreover, as the negative optical power is produced only in the aforementioned portion of the active optical element through which the user is likely looking at distant object(s), it reduces growth signals in a peripheral vision of the user, thereby reducing myopia development. If the negative optical power were being provided continuously even when the eye needs to focus on the objects in close proximity (like in conventional ophthalmic glasses), the lens of the eye would need to generate many dioptres to first overcome the negative optical power and then generate close focus to see clearly the objects in close proximity. Pursuant to embodiments, by selectively producing the negative optical power only in the aforesaid portion of the active optical element and when the optical depth at which the user is looking is greater than the predefined optical depth, the optical apparatus effectively reduces myopia development.

Throughout the present disclosure, the term "optical apparatus" refers to an apparatus that is to be worn over eyes of the user. Examples of such an optical apparatus include, but are not limited to, a pair of glasses, a pair of sunglasses, smart glasses, and a head-mounted display.

Throughout the present disclosure, the term "active optical element" refers to an optical element whose optical power can be changed. In this regard, the aforesaid controlling means is employed to control the active material in the active optical element to generate different optical powers. Said controlling means may, for example, be electrical, piezoelectric, magnetic, mechanical, or a combination thereof, as will be described in more detail later.

It will be appreciated that the processor is at least communicably coupled to the means for determining the optical depth and the controlling means. The processor could be implemented as any one of: a microprocessor, a microcontroller, or a controller. As an example, the processor could be implemented as an application-specific integrated circuit (AISC) chip or a reduced instruction set computer (RISC) chip.

Optionally, the processor is configured to generate another drive signal to drive the controlling means to control the active material in an entirety of the active optical element to produce a base optical power, when it is detected that the optical depth is not greater than the predefined optical depth. Herein, the term "base optical power" refers to an optical power that is provided when the myopia correction is turned off. The base optical power allows the user to see objects in close proximity. The base optical power may be a zero optical power or a positive optical power, depending on the user's need.

In a case where the user is able to see clearly the objects in close proximity with her/his naked eyes, the base optical power is a zero optical power. In another case where the user has hypermetropia or presbyopia, the base optical power is a positive optical power. Optionally, in such a case, the processor is configured to select the base optical power to be produced, from amongst a plurality of base optical powers, based on the optical depth at which the user is looking. In other words, the value of the positive optical power could be based on the optical depth at which the user is looking. As a result, different base optical powers could be produced for different optical depths, even when the user is looking at nearby objects. The plurality of base optical powers can be discrete optical powers, for example, such as 0.75 dioptre, 1 dioptre, 1.5 dioptre, 2 dioptre and so on. As an example, the user may need 1 dioptre at an optical depth of 1 metre, 2 dioptre at an optical depth of 0.5 metre, and so on. This allows to produce an accurate optical power for a particular optical depth at which the user is looking, thereby conforming to the user's need. In both these cases, the base optical power (whether zero or positive optical power), which is to be produced when the optical depth at which the user is looking is not greater than the predefined optical depth, allows the user to see nearby objects clearly.

Optionally, when it is detected that the optical depth at which the user is looking is greater than the predefined optical depth, the processor is configured to generate the drive signal to drive the controlling means to control the active material in a remaining portion of the active optical element to produce the base optical power thereat. In other words, the base optical power (whether zero or positive optical power, depending on the user's need) is optionally produced in the remaining portion of the active optical element in addition to producing the predefined optical power (namely, the negative optical power) in the aforesaid portion of the active optical element, when the optical depth at which the user is looking is greater than the predefined optical depth.

Moreover, the predefined optical power may be as prescribed for the user's eye, or may be selected to conform with the user's need. As an example, the predefined optical power could be selected based on a distance-vision optical power prescribed for the user. Optionally, the processor is configured to select the predefined optical power, from amongst a plurality of predefined optical powers, based on the optical depth at which the user is looking. In other words, the value of the negative optical power could be based on the optical depth at which the user is looking. The technical benefit of selecting the predefined optical power in such a manner is that an accurate optical power can be produced for a particular optical depth at which the user is looking. Thus, the optical apparatus is capable of producing an exact and accurate optical power to conform to the user's need. In this manner, the optical power of the optical apparatus is actively tuned, based on the optical depth at which the user is looking, thereby facilitating vergence accommodation, whilst enabling the user to focus on objects at a wide range of distances in a reproducible manner.

Optionally, the predefined optical depth lies in a range of 1 metre to 10 metres; more optionally, in a range of 1 metre to 4 metres. As an example, if the predefined optical depth is 1.5 metres and the optical depth at which the user is looking lies in a range of 0.1 metre to 1.5 metres, there is no need to activate the myopia correction and produce the predefined optical power (namely, the negative optical power). It will be appreciated that the predefined optical depth could be user-defined or system-defined by default (for example, at the time of manufacture).

It will be appreciated that the predefined optical powers are user specific, and therefore, may beneficially be defined at the time of manufacture. Additionally or alternatively, the processor could be configured to obtain information indicative of the predefined optical powers that are specific to the user. In some implementations, said information could be obtained using a user interface provided by a user device that is communicably coupled to the processor of the optical apparatus. In such implementations, the user could input the predefined optical powers and associate them with different optical depths using the user interface. In other implementations, said information could be obtained from a data repository at which said information is pre-stored. Both these implementations allow the same optical apparatus to be reused for different users, and thus, make the optical apparatus reusable.

Furthermore, in an implementation, the means for determining the optical depth comprises eye-tracking means, the data comprising eye-tracking data collected by the eye-tracking means. In this regard, when processing the data to determine the optical depth, the processor is configured to:
  process the eye-tracking data to determine gaze directions of the user's eyes; and
  determine the optical depth at which the user is looking, based on a convergence of the gaze directions of the user's eyes.

Notably, in this implementation, the optical depth at which the user is looking is determined based on the user's gaze. The optical depth at which the user is looking can be determined, based on an inter-pupillary distance of the user, by using triangulation.

Hereinabove, the term "eye-tracking means" refers to specialized equipment that is employed to detect and/or follow a direction of the user's gaze. Such eye tracking is performed when the optical apparatus, in operation, is worn by the user. Optionally, the eye-tracking means is implemented by way of contact lenses having sensors, cameras monitoring features of the user's eye, and the like. Such features may comprise at least one of: a shape of a pupil of the user's eye, a size of the pupil, corneal reflections of at least one light source from a surface of the user's eye, a relative position of the pupil with respect to the corneal reflections, a relative position of the pupil with respect to corners of the user's eye. Such eye-tracking means are well-known in the art.

In an additional or alternative implementation, the means for determining the optical depth comprises at least one depth sensor, the data comprising sensor data collected by the at least one depth sensor. In this regard, when processing the data to determine the optical depth, the processor is configured to:
  process the sensor data to generate depth information of a real-world scene being seen by the user; and
  determine the optical depth at which the user is looking, based on the depth information of the real-world scene.

Optionally, the depth information comprises a depth map of the real-world scene. Optionally, the at least one depth sensor comprises at least one of: a depth camera, a time-of-flight (ToF) camera, an ultrasound imaging sensor, a radar, a light detection and ranging (Lidar) sensor.

In this additional or alternative implementation, the optical depth at which the user is looking is determined based on the depth information. As an example, the optical depth at which the user is looking could be assumed to be an optical depth of real objects present in a central region of the real-world scene, as the user is most likely to look at the central region of the real-world scene. An angular width of this central region of the real-world scene could lie in a range of 5 degrees to 60 degrees; more optionally, in a range of 15 degrees to 30 degrees.

More optionally, the optical depth at which the user is looking is determined based on the depth information and a gaze direction of a given eye of the user (in front of which said active optical element is worn). In such a case, the optical depth at which the user is looking is determined as an optical depth of a region of interest in the real-world scene at which the user is looking, wherein the region of interest is determined based on the gaze direction of the given eye. In this manner, the aforesaid means for determining the optical depth at which the user is looking could be implemented as:
  the eye-tracking means,
  the at least one depth sensor, or
  a combination of both.

Moreover, in one implementation, the portion of the active optical element at which the predefined optical power is produced could be a central portion of the active optical element. It will be appreciated that humans typically rotate their eyeballs in a region of 60 degrees×60 degrees. Thus, an angular width of the central portion of the active optical element could lie in a range of 5 degrees to 60 degrees; more optionally, in a range of 15 degrees to 30 degrees.

In another implementation, the portion of the active optical element (at which the predefined optical power is produced) could be located specific to the user. In other words, the portion could be located based on a location of a pupillary centre of the user's eye. In such a case, an angular width of said portion of the active optical element could also lie in a range of 5 degrees to 60 degrees; more optionally, in a range of 15 degrees to 30 degrees. Optionally, in such an implementation, the processor is configured to:
  select a portion of the active optical element whose centre overlaps with the pupillary centre of the user's eye, when the optical apparatus is worn by the user; and
  identify the selected portion as the portion of the active optical element at which the predefined optical power is to be produced.

The technical effect of this feature is that it allows the optical apparatus to be personalised and customised for the user, thereby providing a highly comfortable and convenient view to the user. As the aforesaid portion is not a fixed portion in the another implementation, the same optical apparatus can be customised for different users. This makes the optical apparatus highly reusable.

In an additional or alternative implementation, the processor could be configured to determine the portion of the active optical element at which the predefined optical power is to be produced, based on the gaze direction of the given eye in front of which said active optical element is worn. In this regard, said portion of the active optical element is determined in a manner that the user's gaze passes through said portion of the active optical element. As said portion of the active optical element is determined based on the user's gaze, an angular width of said portion of the active optical element could be narrower than the angular width of the central portion of the active optical element. The angular width of such a gaze-based portion of the active optical element could lie in a range of 5 degrees to 45 degrees; more optionally, in a range of 10 degrees to 30 degrees; yet more optionally, in a range of 20 degrees to 30 degrees.

Thus, the portion of the active optical element (at which the negative optical power is produced) could be any one of:
  a fixed, central portion,
  a user-specific portion whose centre overlaps with the pupillary centre of the user's eye, or
  a varying, gaze-based portion.

The aforesaid portion of the active optical element could be shaped as a simple closed curve. Herein, the term "simple closed curve" refers to a connected curve that does not cross itself and ends at the same point where it begins. Hexagons, octagons, circles and ellipses are some examples of simple closed curves. Despite the name "curve", a simple closed curve does not actually have to be curved. Some simple closed curves are made of line segments only, and are known as polygons, while some simple closed curves are made by curved lines only. Other simple closed curves are made of both line segments and curved lines.

Throughout the present disclosure, the term "active material" refers to a material that is controlled to produce one or more optical powers. By "controlling the active material" in the active optical element, it is meant that at least one of the following can be controlled in the active optical element: a curvature of a meniscus of the active material, a refractive index of the active material, an amount of the active material.

Optionally, in this regard, the controlling means is employed to control at least one of: the curvature of the meniscus, the refractive index, the amount of the active material. In some implementations, a given optical power is produced by controlling the curvature of the meniscus of the active material. In other implementations, the given optical power is produced by creating a relative refractive index between the active material and the substrates (namely, the first substrate and the second substrate). In yet other implementations, the given optical power is produced by removing the active material and replacing the active material with air, thereby creating a relative refractive index between the air and the substrates (namely, the first substrate and the second substrate). In all these implementations, a given drive signal for driving said controlling means is generated based on the given optical power that is to be produced. Throughout the present disclosure, the term "given optical power" encompasses the predefined optical power and optionally, the base optical power.

Furthermore, in an embodiment, the controlling means comprises:
at least one first electrode deposited on the first substrate and disposed between the first substrate and the active material; and
a plurality of second electrodes deposited on the second substrate and disposed between the second substrate and the active material, wherein the at least one first electrode and the plurality of second electrodes are optically transparent.

Optionally, the plurality of second electrodes are deposited as a non-continuous, transparent electrode layer comprising separate, unconnected segments of said electrode layer on the second substrate.

Optionally, the at least one first electrode is deposited as a transparent electrode layer on the first substrate. In such a case, the electrode layer covers an entirety of a surface of the first substrate, such that the electrode layer is disposed between said surface of the first substrate and the active material. Alternatively, optionally, the at least one first electrode comprises a plurality of first electrodes that are deposited as a non-continuous, transparent electrode layer comprising separate, unconnected segments of said electrode layer on the first substrate. In such a case, the plurality of first electrodes are aligned with respective ones of the plurality of second electrodes.

Such electrode layers may, for example, be made of indium tin oxide (ITO) or doped zinc oxide (ZnO), where ZnO is doped with aluminium or hydrogen. Alternatively, such electrode layers may be made of a conductive polymer or graphene.

Moreover, the optical apparatus comprises a power source to supply electrical power to the processor as well as the aforesaid electrodes. The power source and the processor may be installed at any suitable location on the optical apparatus. As an example, when the optical apparatus is implemented as a pair of glasses, the power source and the processor may be installed at a frame of said pair of glasses. The power source and/or the processor can be located at a bridge or an end of a temple of the frame.

In order to produce the given optical power, the active material in the active optical element is controlled by generating a potential difference between the at least one first electrode and at least one of the plurality of second electrodes. When the optical depth at which the user is looking is greater than the predefined optical depth, the at least one of the plurality of second electrodes is selected based on a location of the portion at which the predefined optical power is to be produced. In some implementations, when zero potential difference is generated (namely, by applying a same voltage to both the at least one first electrode and the at least one of the plurality of second electrodes), the active optical element is in an 'OFF' mode in which the active optical element produces the base optical power, which may be a positive optical power or a zero optical power depending on the user's need. In such implementations, the active optical element is in an 'ON' mode in which the given optical power is produced, when a given potential difference is generated between the at least one first electrode and the at least one of the plurality of second electrodes depending on the given optical power that is to be produced. In this regard, the at least one first electrode and the at least one of the plurality of second electrodes can be supplied varying voltages to allow different amounts of the potential difference to be generated therebetween.

For illustration purposes only, there will now be described different implementations of the optical apparatus. In some of these implementations, said controlling means (for controlling the active material) is electrical; in other implementations, said controlling means is piezoelectric, magnetic, mechanical or a combination thereof.

In a first implementation, the active material comprises an electrically-conducting liquid and an electrically-insulating liquid, wherein when controlling the active material, the curvature of the meniscus of the active material in the active optical element is controlled to produce the given optical power. In this case, the meniscus is a liquid-liquid interface between the electrically-conducting liquid and the electrically-insulating liquid. The electrically-conducting liquid and the electrically-insulating liquid have different refractive indices; therefore, a particular curvature of the meniscus produces the given optical power.

The first implementation works on the principle of electro-wetting, wherein the curvature of the meniscus of the active material changes with a change in the potential difference. Thus, the given optical power is produced based on an amount of potential difference that is generated between the at least one first electrode and the at least one of the plurality of second electrodes. Moreover, in the first implementation, one of the at least one first electrode and the at least one of the plurality of second electrodes is in contact with the active material, while another of the at least one first electrode and the at least one of the plurality of second electrodes is insulated from the active material by an insulating layer formed thereon.

In a second implementation, the active material is a liquid crystal material, wherein when controlling the active material, an alignment of liquid crystal molecules of the liquid crystal material is controlled to adjust a refractive index of the liquid crystal material in the active optical element, thereby producing the given optical power. The alignment of the liquid crystal molecules in the active optical element changes with a change in the potential difference generated between the at least one first electrode and the at least one of the plurality of second electrodes.

Optionally, the active optical element comprises a first dielectric layer disposed between the first substrate and the at least one first electrode, and a second dielectric layer disposed between the second substrate and the plurality of second electrodes. The first dielectric layer and the second dielectric layer may, for example, be made of silicon oxide ($SiO_x$). Moreover, optionally, the active optical element further comprises a sealing contour of a polymer material that seals the liquid crystal material between the first substrate and the second substrate. The sealing contour not only keeps the liquid crystal material inside, but also protects the liquid crystal material from air (mainly, oxygen) and dust (ambient atmosphere), and thus, ensures a reliable operation of the active optical element.

The second implementation includes three different sub-implementations, namely a sub-implementation 'A' that works on the principle of refractive index matching, a sub-implementation 'B' that works on the principle of liquid crystal Fresnel lenses, and a sub-implementation 'C' that works on the principle of diffractive Fresnel lens.

Figure 4A:
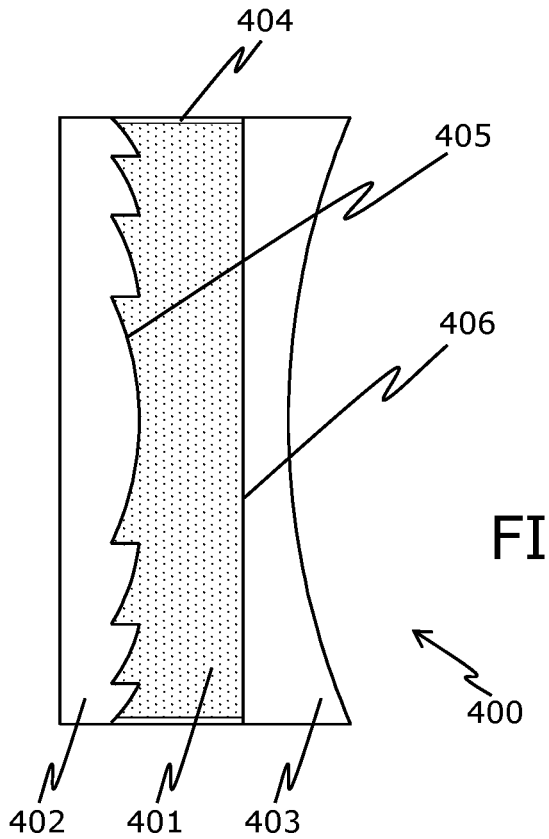
FIGS. 4A and 4B are cross-sectional views of an optical apparatus for reducing myopia development, in accordance with various embodiments of the present disclosure.
Figure 4B:
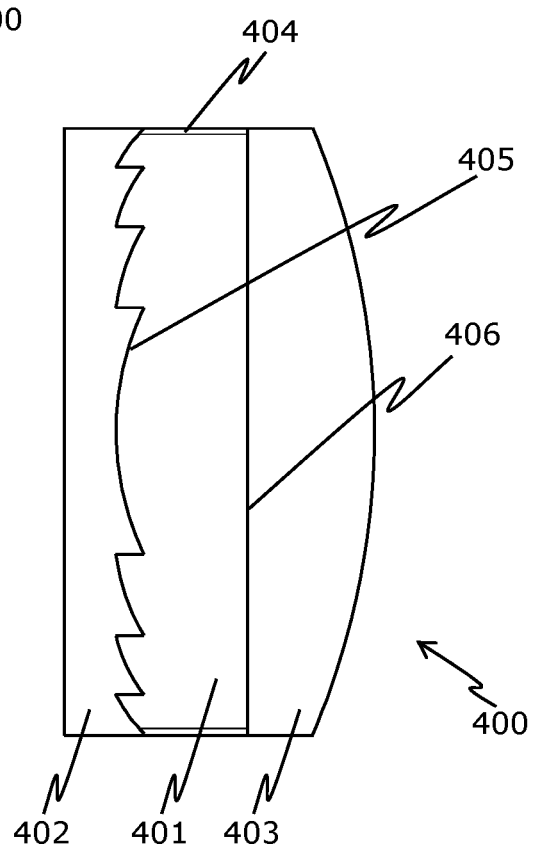

Some examples of the sub-implementation 'A' have been illustrated in conjunction with FIGS. 4A and 4B. In the sub-implementation 'A' of the second implementation, at least one of the first substrate, the second substrate is implemented as a Fresnel lens having concentric grooves, wherein the concentric grooves face the liquid crystal material encased between the first substrate and the second substrate. The at least one of the first substrate, the second substrate that is implemented as a Fresnel lens is hereinafter referred to as the "Fresnel substrate", for the sake of convenience only. The shape of the concentric grooves can be refractive or diffractive.

In the sub-implementation 'A', the concentric grooves of the Fresnel substrate can be formed to emulate characteristics of a planoconvex lens whose curvature corresponds to the base optical power, for example, when the base optical power is a positive optical power. In such a case, at least one of the first substrate, the second substrate could be implemented to have a concave surface that is not in contact with the liquid crystal material (for example, similar to a plano-concave lens), such that the curvature of the concave surface corresponds to the predefined optical power, which is a negative optical power depending on the user's need. When the refractive index of the liquid crystal material is adjusted to match a refractive index of the Fresnel substrate at the aforesaid portion of the active optical element, an interface between the liquid crystal material and the concentric grooves of the Fresnel substrate disappears at said portion. As a result, the aforesaid portion of the active optical element does not produce the base optical power, and the optical apparatus produces only the predefined optical power from the aforesaid concave surface at said portion. In the remaining portion of the active optical element, a combined optical power (namely, a combination of the base optical power and the predefined optical power) could be produced depending on a relative refractive index created between the refractive index of the liquid crystal material and the refractive index of the Fresnel substrate. When the refractive index of the liquid crystal material in the active optical element is adjusted to be different from (optionally, to be lower than) the refractive index of the Fresnel substrate at the remaining portion or the entirety of the active optical element, the interface between the liquid crystal material and the concentric grooves of the Fresnel substrate re-appears, thereby producing the base optical power at the remaining portion or the entirety of the active optical element; the base optical power is then combined with the predefined optical power (from the aforesaid concave surface) to produce the combined optical power. One such implementation of the optical apparatus has been illustrated in conjunction with FIG. 4A.

Alternatively, the concentric grooves of the Fresnel substrate can be formed to emulate characteristics of a plano-concave lens whose curvature corresponds to the predefined optical power, namely the negative optical power. When the base optical power is a positive optical power, at least one of the first substrate, the second substrate could be implemented to have a convex surface that is not in contact with the liquid crystal material (for example, similar to a plano-convex lens), such that the curvature of the convex surface corresponds to the base optical power. When the refractive index of the liquid crystal material is adjusted to match the refractive index of the Fresnel substrate in an entirety of the active optical element, an interface between the liquid crystal material and the concentric grooves of the Fresnel substrate disappears. As a result, the active optical element does not produce the predefined optical power, and the optical apparatus produces only the base optical power from the aforesaid convex surface. When the refractive index of the liquid crystal material in the aforesaid portion of the active optical element is adjusted to be different from (optionally, to be lower than) the refractive index of the Fresnel substrate, the interface between the liquid crystal material and the concentric grooves of the Fresnel substrate re-appears and the predefined optical power is produced at the aforesaid portion and is combined with the base optical power to produce a combined optical power at the aforesaid portion. In the remaining portion of the active optical element, the active optical element does not produce the predefined optical power, and the optical apparatus produces only the base optical power from the aforesaid convex surface. One such implementation of the optical apparatus has been illustrated in conjunction with FIG. 4B.

The technical benefit of employing the Fresnel substrate in the sub-implementation 'A' is that it allows the active optical element to operate with a thin layer of the liquid crystal material. Thinner the layer of the liquid crystal material, lower is the amount of potential difference that is required to adjust the refractive index of the liquid crystal material. Thus, electrical power requirements of the active optical element are reduced greatly.

In the sub-implementation 'B' of the second implementation, the active optical element is implemented as a liquid crystal Fresnel lens. The liquid crystal Fresnel lens has concentric zones, which are formed entirely by adjusting the refractive index of the liquid crystal material in said concentric zones by applying different voltages in corresponding second electrodes. In other words, these concentric zones are not physical grooves, and are formed by applying the different voltages to the liquid crystal material itself. The refractive index of the liquid crystal material in said concentric zones is adjusted to produce the given optical power (which could be the predefined optical power or the base optical power). An example of such a liquid crystal Fresnel lens has been illustrated in conjunction with FIG. 5.

In a case when the optical depth at which the user is looking is not greater than the predefined optical depth, the concentric zones of the liquid crystal Fresnel lens can be formed to emulate characteristics of a planoconvex lens whose curvature corresponds to the base optical power (when the base optical power is a positive optical power). In another case when the optical depth at which the user is looking is greater than the predefined optical depth, the predefined optical power (namely, the negative optical power) is to be produced in the portion of the active optical element, while the base optical power is to be optionally produced in the remaining portion of the active optical element. In such a case, the concentric zones of the liquid crystal Fresnel lens in the aforesaid portion of the active optical element can be formed to emulate characteristics of a planoconcave lens whose curvature corresponds to the predefined optical power (namely, the negative optical power), while the concentric zones of the liquid crystal Fresnel lens in the remaining portion of the active optical element can be formed to emulate characteristics of a planoconvex lens whose curvature corresponds to the base optical power (namely, the positive optical power).

It will be appreciated that in order to be able to form said concentric zones, the plurality of second electrodes are optionally arranged in a form of a spiral phyllotactic pattern. Such a spiral phyllotactic pattern is similar to how sunflower seeds are arranged in a sunflower. One example of such a spiral phyllotactic pattern has been illustrated in conjunction with FIG. 3D. The technical benefit of arranging the plurality of second electrodes in the form of a spiral phyllotactic pattern is that the number and thicknesses of said concentric zones can be modified on the fly.

In this way, different optical powers can be produced in the active optical element depending on an arrangement and shapes of the plurality of second electrodes and voltages applied to the at least one first electrode and the plurality of second electrodes.

In the sub-implementation 'C' of the second implementation, the active optical element comprises a matrix of diffractive zones whose refractive index can be varied. In a given diffractive zone, the refractive index of the liquid crystal material is adjusted to cause a phase retardation of an incident light beam. In order to operate the active optical element as a diffractive Fresnel lens, the liquid crystal material in the diffractive zones is controlled to produce differently delayed light wavefronts.

Optionally, in the sub-implementation 'C', the active optical element comprises at least one other substrate, namely in addition to the first substrate and the second substrate. In such a case, a separate layer of the liquid crystal material is encased between the second substrate and the at least one other substrate. Moreover, at least one pair of electrodes is also deposited on the second substrate and the at least one other substrate. The at least one pair of electrodes can be implemented in a manner that is similar to how the at least one first electrode and the plurality of second electrodes are implemented. The technical benefit of having multiple layers of the liquid crystal material whose refractive index can be adjusted using corresponding electrodes is that they enable the active optical element to function as a multiphase spatial light modulator (SLM).

In this way, the active optical element can be implemented as any one of: a liquid crystal Fresnel lens, a diffractive Fresnel lens.

Furthermore, in a third implementation, the active material is a fluid whose refractive index matches a refractive index of at least one of: the first substrate, the second substrate, and wherein when controlling the active material, an amount of the fluid in the active optical element is varied, thereby producing the given optical power. The third implementation works on the principle of refractive index matching.

Optionally, in the third implementation, separate fluid zones are created in a central portion and a plurality of sectors of the active optical element, the active material being encased in each of the separate fluid zones, wherein the plurality of sectors surround the central portion. One such example implementation has been illustrated in conjunction with FIG. 3C. In such a case, when controlling the active material, an amount of the fluid in at least one of: the central portion, at least one of the plurality of sectors is varied, thereby producing the predefined optical power at the aforesaid portion of the active optical element. In this regard, the portion of the active optical element corresponds to the at least one of: the central portion, the at least one of the plurality of sectors.

In the third implementation, the at least one of: the first substrate, the second substrate could be implemented as a planoconcave lens whose concave surface faces said fluid, and whose curvature corresponds to the predefined optical power, namely the negative optical power. Alternatively, the at least one of: the first substrate, the second substrate could be implemented as a Fresnel lens having concentric grooves, wherein the concentric grooves face said fluid. In such a case, the concentric grooves of the Fresnel substrate are formed to emulate characteristics of the aforesaid planoconcave lens.

When the fluid is filled in all the fluid zones of the active optical element, an interface between the fluid and the at least one of: the first substrate, the second substrate disappears, because the refractive index of the fluid matches the refractive index of the at least one of: the first substrate, the second substrate. As a result, the active optical element produces the base optical power, which may be a positive optical power or a zero optical power depending on the user's need. When the fluid is removed from the at least one of: the central portion, the at least one of the plurality of sectors, air replaces the removed fluid. As a refractive index of air is lower than the refractive index of the fluid, the interface between air and the at least one of: the first substrate, the second substrate re-appears, thereby producing the predefined optical power at the aforesaid portion (namely, the at least one of: the central portion, the at least one of the plurality of sectors), while the remaining part of the active optical element has the base optical power. As an example, the refractive index of the fluid and the refractive index of the at least one of: the first substrate, the second substrate could be 1.4, whereas the refractive index of air is 1. This allows for a relative refractive index of 0.4.

In the third implementation, the controlling means is employed to vary the amount of the fluid. Optionally, said means comprises capillaries that are to be employed to remove the fluid by capillary action in at least one fluid channel, which connects the active optical element with at least one fluid reservoir.

Optionally, said means comprises valves that are employed to control corresponding capillaries. The valves may be mechanical valves, which could be controlled by actuators. These actuators may, for example, be implemented as electromagnetic actuators, piezoelectric actuators, memory metal actuators, electro-active polymers, electrophoresis actuators or similar. Alternatively, optionally, said means employs another technique for surface energy control in the at least one fluid channel using electricity.

It will be appreciated that the refractive index of the first substrate can be same as or different from the refractive index of the second substrate. The base optical power or the predefined optical power that is to be produced by the active optical element depends on the curvature of surfaces of the first substrate and/or the second substrate. Moreover, the first substrate and/or the second substrate can be made of any one of: glass, a polycarbonate, a plastic, a high-index plastic. A person skilled in the art will recognize many variations, alternatives, and modifications of embodiments of the present disclosure.

Optionally, the active optical element is implemented as a refractive lens. More optionally, the active optical element is implemented as a refractive liquid crystal lens, as illustrated earlier.

Moreover, in an embodiment, the optical apparatus further comprises a passive optical element per eye, arranged on an optical path of the active optical element, the passive optical element having a fixed optical power, wherein the fixed optical power of the passive optical element is combined with the predefined optical power (or the base optical power) to produce a combined optical power. Herein, the combined optical power refers to a sum of the fixed optical power and the predefined optical power (or the base optical power). Optionally, a centre of the passive optical element is aligned with the pupillary centre of the given eye of the user.

Throughout the present disclosure, the term "passive optical element" refers to an optical element whose optical power cannot be changed. In other words, the optical power of the passive optical element is fixed. Optionally, the optical power of the passive optical element is any one of: a positive optical power, a zero optical power. In this regard, the positive optical power may be prescribed for the user's hypermetropia or presbyopia. Alternatively, optionally, the optical power of the passive optical element is a negative optical power.

The passive optical element can be employed in at least some of the aforementioned implementations, for example, such as the first implementation (that is based on the principle of electro-wetting), the sub-implementation 'A' of the second implementation (that is based on the principle of refractive index matching), the sub-implementation 'C' of the second implementation (that is based on the principle of diffractive Fresnel lens), and the third implementation (that is based on the principle of refractive index matching). Optionally, the passive optical element is implemented as any one of: the first substrate, the second substrate.

In some implementations, when the active optical element is switched 'OFF', the active optical element produces no optical power. In such implementations, the combined optical power can be employed to produce the base optical power. As an example, a surface of one of the first substrate and the second substrate through which light would exit towards the user's eye, during operation of the optical apparatus, could be made planoconvex, such that a curvature of said surface corresponds to the base optical power. As mentioned earlier, the base optical power can be a positive optical power or a zero optical power depending on the user's need. Thus, the passive optical element can be beneficially employed to compensate for the condition of hypermetropia or presbyopia in the user. However, in a case where the user only requires myopia correction, the passive optical element may have zero optical power.

In other implementations, the passive optical element can be implemented as a Fresnel lens having concentric zones, for example, such as the aforementioned Fresnel substrate. In such a case, the combined optical power is employed to produce the negative optical power for myopia correction.

The present disclosure also relates to the method of the second aspect as described above. Various embodiments and variants disclosed above, with respect to the aforementioned first aspect, apply mutatis mutandis to the method.

Optionally, the method further comprises configuring the processor to generate another drive signal to drive the controlling means to control the active material in an entirety of the active optical element to produce a base optical power, when it is detected that the optical depth is not greater than the predefined optical depth.

Optionally, the means for determining comprises eye-tracking means, the data comprising eye-tracking data collected by the eye-tracking means, wherein the step of configuring the processor to process the data to determine the optical depth comprises configuring the processor to:
  process the eye-tracking data to determine gaze directions of the user's eyes; and
  determine the optical depth at which the user is looking, based on a convergence of the gaze directions of the user's eyes.

Additionally or alternatively, optionally, the means for determining comprises at least one depth sensor, the data comprising sensor data collected by the at least one depth sensor, wherein the step of configuring the processor to process the data to determine the optical depth comprises configuring the processor to:
  process the sensor data to generate depth information of a real-world scene being seen by the user; and
  determine the optical depth at which the user is looking, based on the depth information of the real-world scene.

Moreover, optionally, the method further comprises configuring the processor to select the predefined optical power, from amongst a plurality of predefined optical powers, based on the optical depth at which the user is looking.

Optionally, the portion of the active optical element at which the predefined optical power is produced is a central portion of the active optical element. Alternatively, optionally, the method further comprises configuring the processor to determine the portion of the active optical element at which the predefined optical power is to be produced, based on a gaze direction of a given eye in front of which said active optical element is worn.

Furthermore, optionally, the controlling means is employed to control at least one of: a curvature of a meniscus, a refractive index, an amount of the active material. Optionally, the controlling means comprises:
  at least one first electrode deposited on the first substrate and disposed between the first substrate and the active material; and
  a plurality of second electrodes deposited on the second substrate and disposed between the second substrate and the active material, wherein the at least one first electrode and the plurality of second electrodes are optically transparent.

In a first implementation, the active material comprises an electrically-conducting liquid and an electrically-insulating liquid, wherein when controlling the active material, a curvature of a meniscus of the active material in the active optical element is controlled to produce a given optical power, the meniscus being a liquid-liquid interface between the electrically-conducting liquid and the electrically-insulating liquid.

In a second implementation, the active material is a liquid crystal material, wherein when controlling the active material, an alignment of liquid crystal molecules of the liquid crystal material is controlled to adjust a refractive index of the liquid crystal material in the active optical element, thereby producing the given optical power.

In a third implementation, the active material is a fluid whose refractive index matches a refractive index of at least one of: the first substrate, the second substrate, and wherein when controlling the active material, an amount of the fluid in the active optical element is varied, thereby producing the given optical power.

Optionally, the active optical element is implemented as a refractive lens.

Optionally, the method further comprises employing a passive optical element per eye, arranged on an optical path of the active optical element, the passive optical element having a fixed optical power, wherein the fixed optical power of the passive optical element is combined with the predefined optical power to produce a combined optical power. Optionally, the passive optical element is implemented as any one of: the first substrate, the second substrate.

DETAILED DESCRIPTION OF THE DRAWINGS

FIG. 1 is a schematic diagram of an optical apparatus 100, according to an embodiment of the present disclosure. The optical apparatus 100 comprises means 102 for determining an optical depth at which a user is looking; an active optical element per eye, depicted as an active optical elements 104a and 104b for a first eye and a second eye of the user, respectively; controlling means for controlling an active material in the active optical element, depicted as controlling means 106a and 106b for the active optical elements 104a and 104b, respectively; and a processor 108. The processor 108 is configured to perform operations as per the aforementioned first aspect.

Figure 2A:
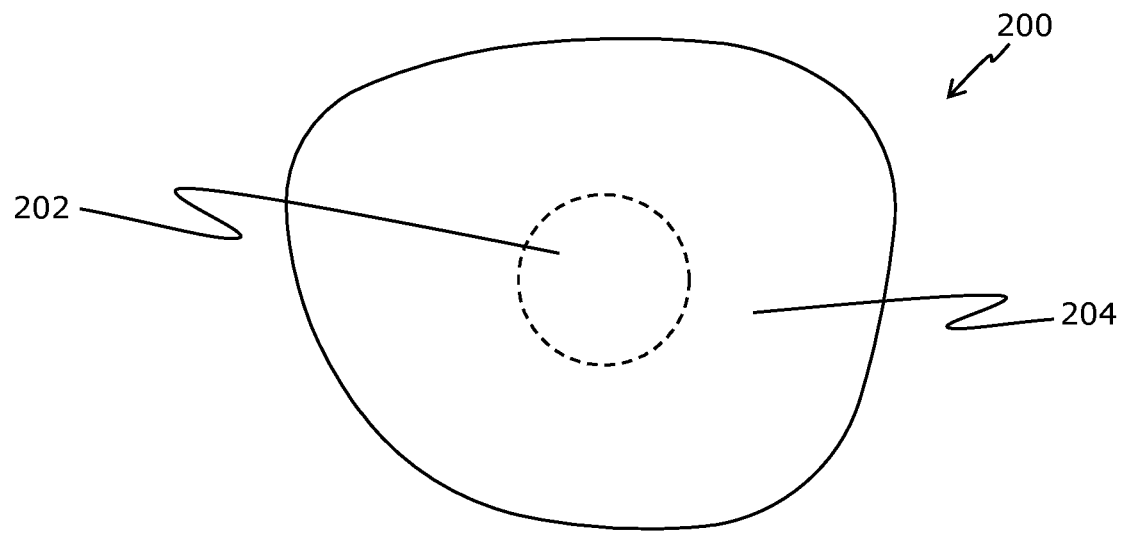
FIGS. 2A and 2B are schematic diagrams of an active optical element, in accordance with different embodiments of the present disclosure.
Figure 2B:
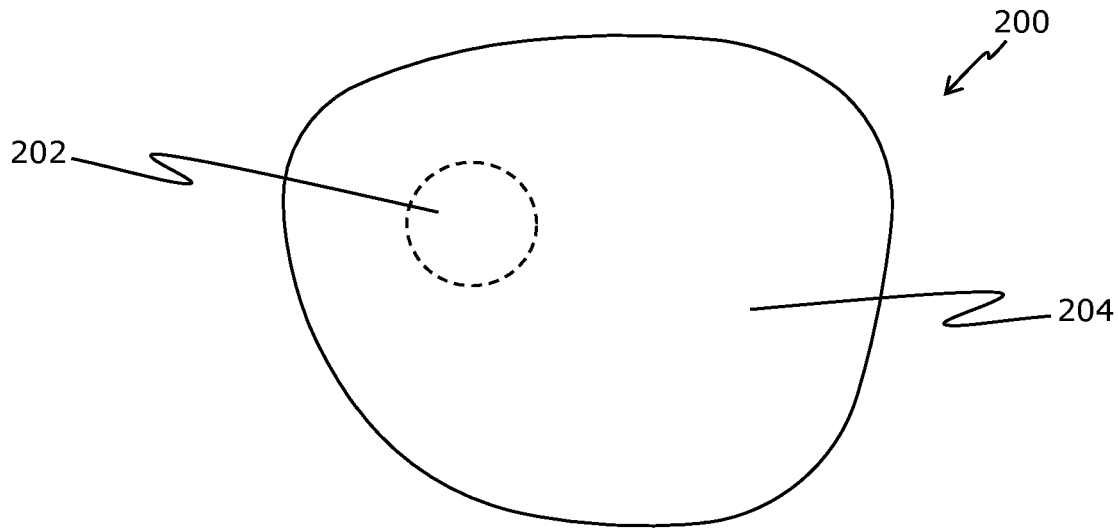

FIGS. 2A and 2B are schematic diagrams of an active optical element 200, in accordance with different embodiments of the present disclosure. When it is detected that an optical depth at which a user is looking is greater than a predefined optical depth, a predefined optical power (namely, a negative optical power) is produced in a portion 202 of the active optical element 200. Optionally, in such a case, a base optical power is produced in a remaining portion 204 of the active optical element 200.

With reference to FIG. 2A, the portion 202 could be a fixed, central portion or a user-specific portion whose centre overlaps with a pupillary centre of the user's eye. With reference to FIG. 2B, the portion 202 could be a varying, gaze-based portion.

FIGS. 2A and 2B are merely examples, which should not unduly limit the scope of the claims herein. It is to be understood that the specific implementations of the active optical element 200 are provided as examples and are not to be construed as limiting it to specific shapes, sizes or locations of the portion 202 as well as to specific shapes or sizes of the active optical element 200. A person skilled in the art will recognize many variations, alternatives, and modifications of embodiments of the present disclosure. In FIGS. 2A and 2B, the portion 202 has been shown with dotted lines to indicate that it is not marked physically on the active optical element 200.

Figure 3A:
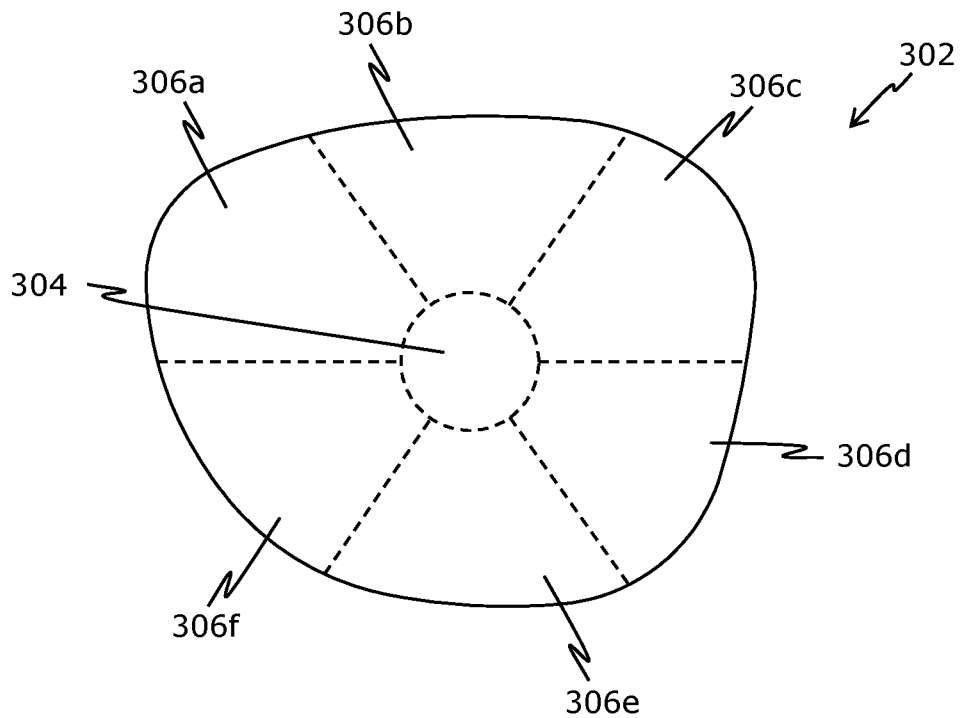
FIGS. 3A-3C are schematic diagrams of an active optical element that is implemented to have a central portion and a plurality of sectors, in accordance with various embodiments of the present disclosure.
Figure 3B:
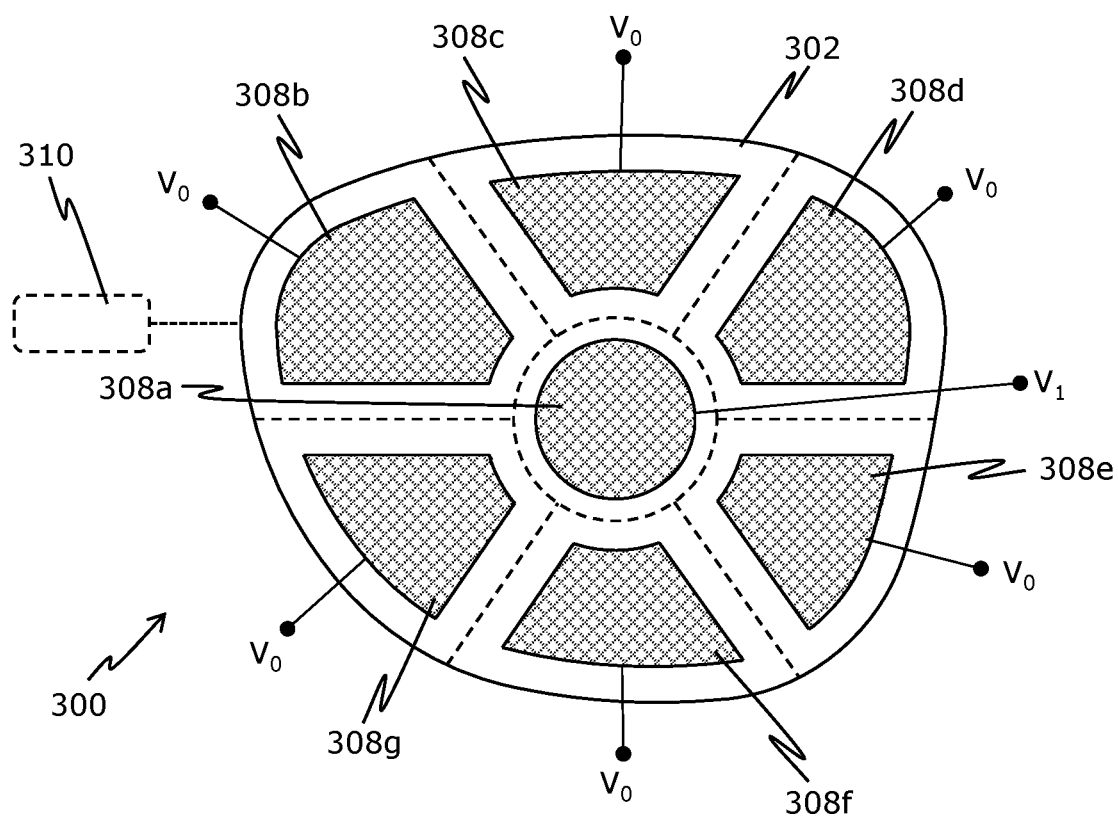
Figure 3C:
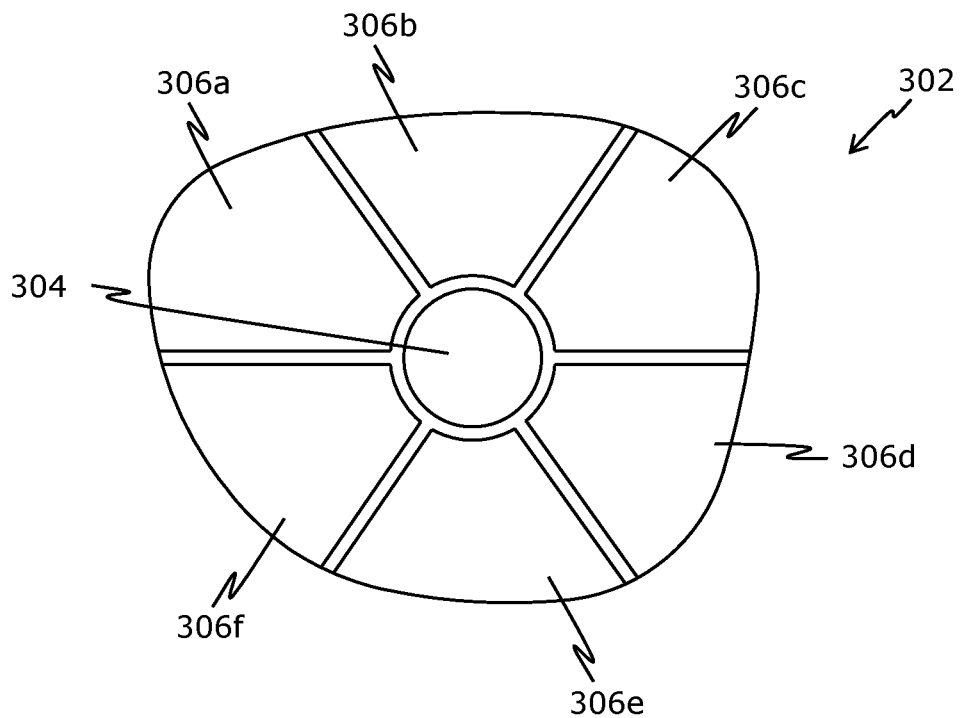

Referring to FIGS. 3A-3C, illustrated is an active optical element 302, in accordance with various embodiments of the present disclosure. The active optical element 302 has a central portion 304 and a plurality of sectors 306a-f.

With reference to FIGS. 3A and 3B, the active optical element 302 is divided only virtually into the central portion 304 and the plurality of sectors 306a-f. In other words, an active material in the central portion 304 and in each of the plurality of sectors 306a-f is not required to be separated by physical boundaries.

With reference to FIG. 3C, the active optical element 302 is divided physically into the central portion 304 and the plurality of sectors 306a-f. In other words, the active material in the central portion 304 and in each of the plurality of sectors 306a-f is separated by physical boundaries. In one implementation, the active material is a fluid whose refractive index matches a refractive index of at least one of: a first substrate, a second substrate, wherein the active material is encased between the first substrate and the second substrate. In such an implementation, separate fluid zones are created in the central portion 304 and the plurality of sectors 306a-f.

In FIG. 3B, there is shown an optical apparatus 300 comprising the active optical element 302, controlling means for controlling the active material (in the central portion 304 and the plurality of sectors 306a-f), and a processor 310. Optionally, said controlling means comprises at least one first electrode (not shown) and a plurality of second electrodes 308a-g deposited on the first substrate and the second substrate, respectively. The second electrode 308a corresponds to the central portion 304, while the second electrodes 308b-g correspond to respective ones of the plurality of sectors 306a-f. The at least one first electrode may be implemented as a single electrode layer or as a plurality of first electrodes that are aligned with respective ones of the plurality of second electrodes 308a-g.

For illustration purposes only, there will now be considered an example implementation in which a predefined optical power (namely, a negative optical power) is to be produced in the central portion 304, which corresponds to the second electrode 308a. If a first voltage $V_0$ is applied to the at least one first electrode and to the second electrodes 308b-g, zero potential difference is generated between the at least one first electrode and the second electrodes 308b-g, thereby producing a base optical power in the sectors 306a-f. As shown in FIG. 3B, a second voltage $V_1$ is applied to the second electrode 308a, to generate a potential difference between the at least one first electrode and the second electrode 308a, thereby producing the predefined optical power in the central portion 304.

Figure 3D:
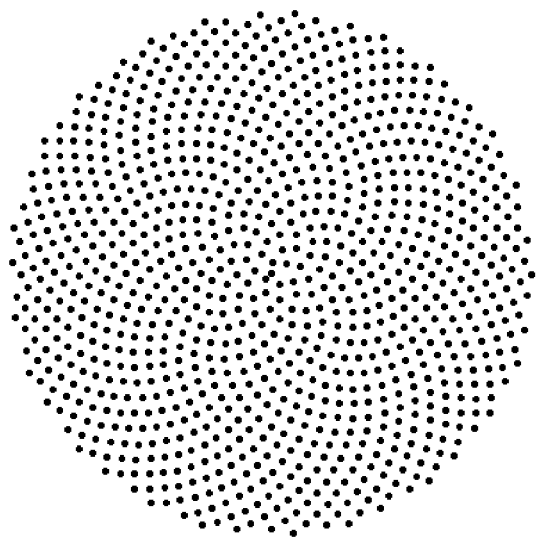
FIG. 3D depicts an example spiral phyllotactic pattern in which a plurality of electrodes can be arranged, in accordance with an embodiment of the present disclosure.

FIGS. 3A-3C are merely examples, which should not unduly limit the scope of the claims herein. It is to be understood that the specific implementations of the active optical element 302 are provided as examples and are not to be construed as limiting it to specific numbers or arrangements of the sectors and the second electrodes. A person skilled in the art will recognize many variations, alternatives, and modifications of embodiments of the present disclosure. For example, in order to be able to provide the predefined optical power at different portions of the active optical element 302 at different points in time, the plurality of second electrodes can be arranged in a form of a spiral phyllotactic pattern, as shown in FIG. 3D.

Referring next to FIGS. 4A and 4B, illustrated are cross-sectional views of an optical apparatus 400, in accordance with various embodiments of the present disclosure. The optical apparatus 400 comprises an active optical element that comprises an active material 401 encased between a first substrate 402 and a second substrate 403. The active optical element optionally comprises a sealing contour 404. At least one first electrode 405 is disposed between the active material 401 and the first substrate 402, and a plurality of second electrodes 406 are disposed between the active material 401 and the second substrate 403.

As shown in FIGS. 4A-4B, the first substrate 402 is implemented as a Fresnel lens having concentric grooves, wherein the concentric grooves face the active material 401. With reference to FIG. 4A, the concentric grooves of the Fresnel substrate are formed to emulate characteristics of a planoconvex lens whose curvature corresponds to a base optical power (when the base optical power is a positive optical power), while the second substrate 403 is implemented as a planoconcave lens whose curvature corresponds to a predefined optical power, which is a negative optical power.

On the other hand, with reference to FIG. 4B, the concentric grooves of the Fresnel substrate are formed to emulate characteristics of a planoconcave lens whose curvature corresponds to the predefined optical power, while the second substrate 403 is implemented as a planoconvex lens whose curvature corresponds to the base optical power. It will be appreciated that when the base optical power is a zero optical power, the second substrate 403 could be implemented as a planar substrate.

In the implementations illustrated in FIGS. 4A and 4B, the second substrate 403 acts as a passive optical element in the optical apparatus 400.

In an implementation that works on the principle of refractive index matching and where the active material 401 is a liquid crystal material, a refractive index of the liquid crystal material can be adjusted to produce a given optical power. With reference to FIG. 4A, when the refractive index of the liquid crystal material matches a refractive index of the first substrate 402 at a portion of the active optical element, but differs from the refractive index of the first substrate 402 at a remaining portion of the active optical element, an interface between the active material 401 and the first substrate 402 disappears at said portion of the active optical element. As a result, the base optical power is not produced at said portion, and thus, the optical apparatus 400 produces the predefined optical power (from the second substrate 403 acting as the passive optical element) at the portion of the active optical element, whilst optionally producing a combined optical power at the remaining portion of the active optical element; the combined optical power being a combination of the base optical power and the predefined optical power.

On the other hand, with reference to FIG. 4B, when the refractive index of the liquid crystal material matches a refractive index of the first substrate 402 at a remaining portion of the active optical element, but differs from the refractive index of the first substrate 402 at the portion of the active optical element, an interface between the active material 401 and the first substrate 402 disappears at the remaining portion. As a result, the active optical element produces the predefined optical power at the portion of the active optical element, which is then combined with the base optical power of the second substrate 403. At the remaining portion of the active optical element, the predefined optical power is not produced, and thus, the optical apparatus 400 produces the base optical power at the remaining portion.

For illustration purposes, there will now be considered another implementation that works on the principle of refractive index matching and where the active material 401 is a fluid whose refractive index matches the refractive index of the first substrate 402. With reference to FIG. 4A, a portion of the active optical element in which the fluid is filled would not produce the base optical power, and thus, the optical apparatus 400 would produce the predefined optical power (from the second substrate 403) at said portion. In a remaining portion of the active optical element in which the fluid is removed and replaced with air, the interface between the air and the first substrate 402 reappears, thereby producing the base optical power at the remaining portion, which is then combined with the predefined optical power (from the second substrate 403) to produce the combined optical power.

On the other hand, with reference to FIG. 4B, a portion of the active optical element in which the fluid is not filled (the fluid being replaced with air) would produce the predefined optical power, which is then combined with the base optical power (from the second substrate 403) to produce the combined optical power at said portion. In a remaining portion of the active optical element in which the fluid is filled (and not replaced with air), the interface between the air and the first substrate 402 disappears, thereby producing only the base optical power (from the second substrate 403).

FIGS. 4A-4B are merely examples, which should not unduly limit the scope of the claims herein. It is to be understood that the specific implementations of the optical apparatus 400 are provided as examples and are not to be construed as limiting it to specific arrangements of the first substrate, the second substrate, the at least one first electrode and the plurality of second electrodes, or to specific curvatures of the first substrate and the second substrate. A person skilled in the art will recognize many variations, alternatives, and modifications of embodiments of the present disclosure. For example, in order to be able to provide the optical powers (at different portions of the active optical element) as per the user's need, an amount of optical power in the predefined optical power and the base optical power can be selected, based on the type of implementation of the optical apparatus 400.

Figure 5:
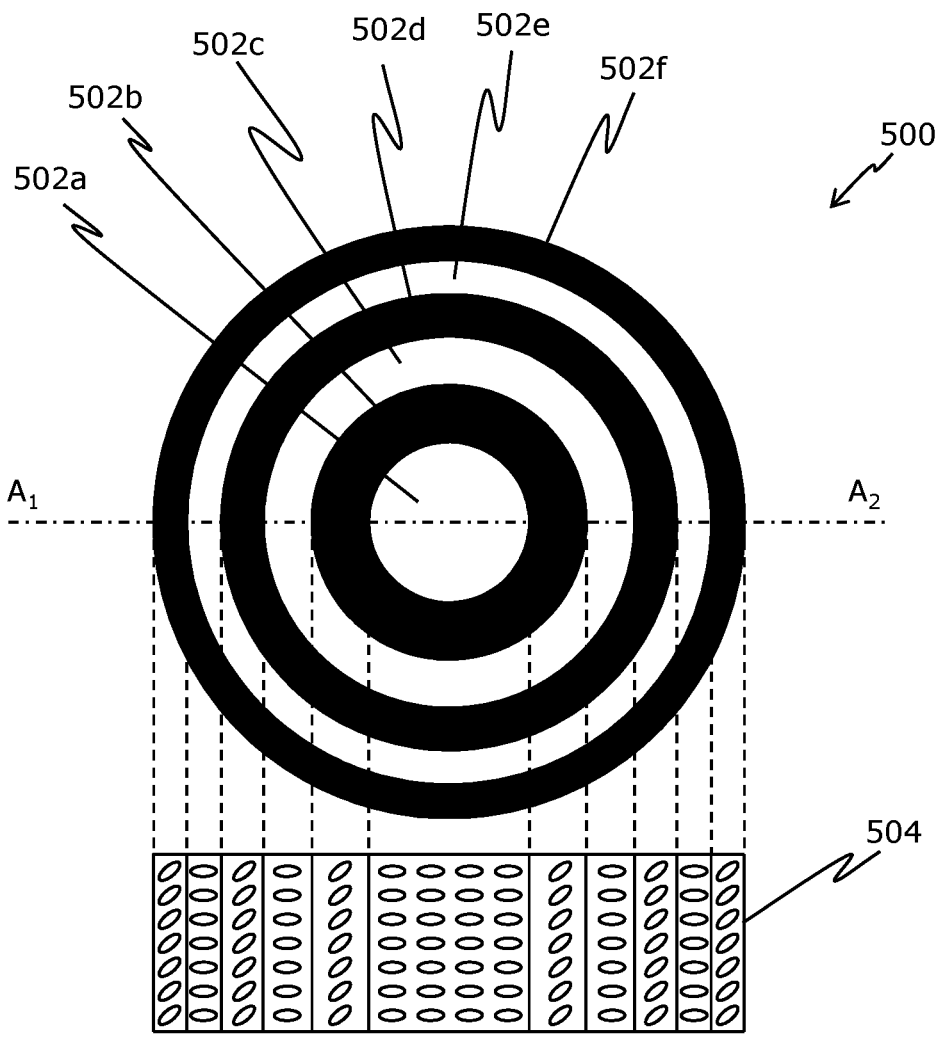
FIG. 5 is a schematic diagram of a liquid crystal Fresnel lens, in accordance with an embodiment of the present disclosure.

Referring next to FIG. 5, illustrated is a schematic diagram of a liquid crystal Fresnel lens 500, in accordance with an embodiment of the present disclosure. The liquid crystal Fresnel lens 500 comprises a plurality of concentric zones 502a-f in which a refractive index of a liquid crystal material is to be adjusted differently to emulate characteristics of a Fresnel lens. A cross-section 504 of the liquid crystal Fresnel lens 500 across line $A_1$-$A_2$, shown at a bottom part of FIG. 5, depicts that the refractive index of the liquid crystal material is adjusted by controlling an alignment of liquid crystal molecules in the plurality of concentric zones 502a-f.

FIG. 5 is merely an example, which should not unduly limit the scope of the claims herein. A person skilled in the art will recognize many variations, alternatives, and modifications of embodiments of the present disclosure.

Figure 6:
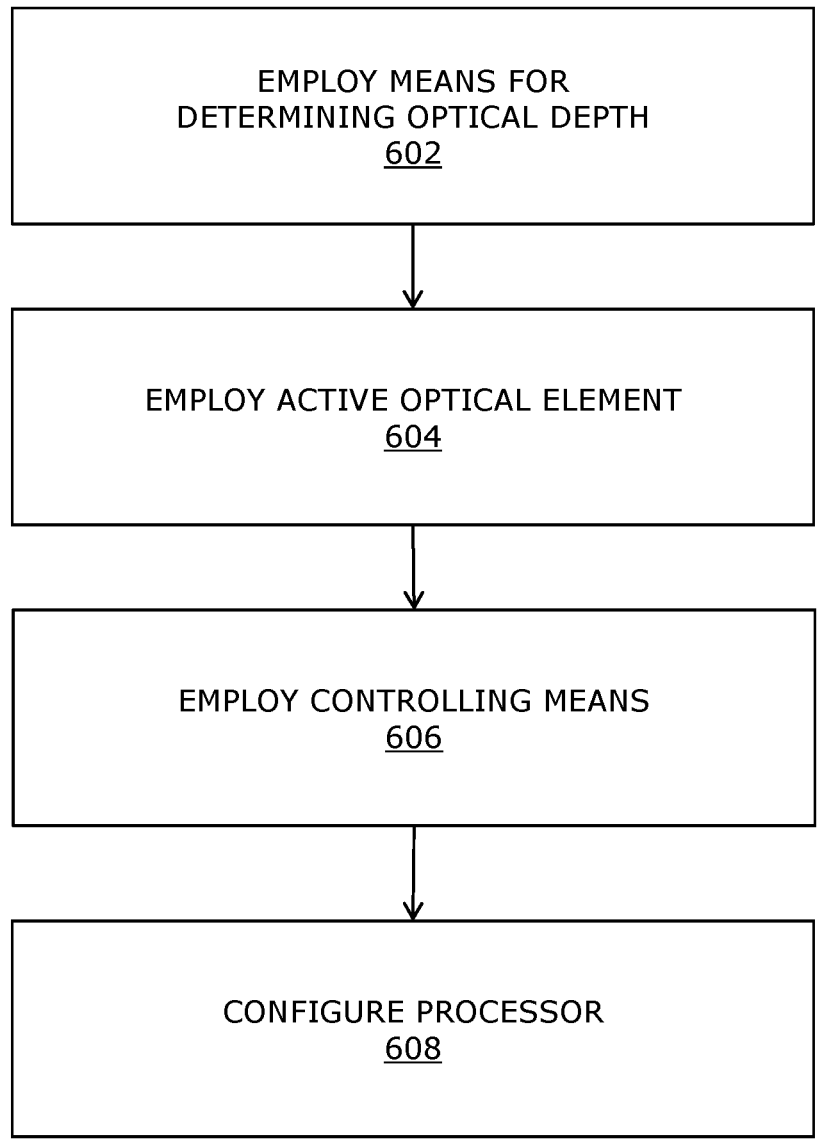
FIG. 6 depicts steps of a method for manufacturing an optical apparatus, in accordance with an embodiment of the present disclosure.

Referring to FIG. 6, illustrated are steps of a method for manufacturing an optical apparatus, in accordance with an embodiment of the present disclosure. At a step 602, means for determining an optical depth at which a user is looking is employed. At a step 604, an active optical element is employed; the active optical element being formed by encasing an active material between at least a first substrate and a second substrate, the first substrate and the second substrate being optically transparent. At a step 606, controlling means for controlling the active material in the active optical element is employed. At a step 608, a processor is configured to perform various operations as per the aforementioned first aspect.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

The invention claimed is:

1. An optical apparatus for reducing myopia development, comprising:
   means for determining an optical depth at which a user is looking;
   an active optical element per eye, comprising an active material encased between at least a first substrate and a second substrate, the first substrate and the second substrate being optically transparent;
   controlling means for controlling the active material in the active optical element to generate one or more optical powers; and
   a processor configured to:
      process data, collected by the means for determining, to determine the optical depth at which the user is looking;
      detect when the optical depth at which the user is looking is greater than a predefined optical depth; and
      when it is detected that the optical depth is greater than the predefined optical depth, generate a drive signal to drive the controlling means to control the active material in a portion of the active optical element through which the user is looking to produce a predefined negative optical power based on a distance-vison optical power prescribed for the user; and
      at the same time, generate another drive signal to drive the controlling means to control the active material in a remainder of the active optical element to produce a base optical power.

2. The optical apparatus of claim 1, wherein the means for determining comprises eye-tracking means, the data comprising eye-tracking data collected by the eye-tracking means, wherein when processing the data to determine the optical depth, the processor is configured to:
   process the eye-tracking data to determine gaze directions of the user's eyes; and
   determine the optical depth at which the user is looking, based on a convergence of the gaze directions of the user's eyes.

3. The optical apparatus of claim 1, wherein the means for determining comprises at least one depth sensor, the data comprising sensor data collected by the at least one depth sensor, wherein when processing the data to determine the optical depth, the processor is configured to:
   process the sensor data to generate depth information of a real-world scene being seen by the user; and
   determine the optical depth at which the user is looking, based on the depth information of the real-world scene.

4. The optical apparatus of claim 1, wherein the processor is configured to select the predefined optical power, from amongst a plurality of predefined optical powers, based on the optical depth at which the user is looking.

5. The optical apparatus of claim 1, wherein the portion of the active optical element at which the predefined optical power is produced is a central portion of the active optical element.

6. The optical apparatus of claim 1, wherein the processor is configured to determine the portion of the active optical element at which the predefined optical power is to be produced, based on a gaze direction of a given eye in front of which said active optical element is worn.

7. The optical apparatus of claim 1, wherein the controlling means is employed to control at least one of: a curvature of a meniscus, a refractive index, an amount of the active material.

8. The optical apparatus of claim 1, wherein the controlling means comprises:
   at least one first electrode deposited on the first substrate and disposed between the first substrate and the active material; and
   a plurality of second electrodes deposited on the second substrate and disposed between the second substrate and the active material,
   wherein the at least one first electrode and the plurality of second electrodes are optically transparent.

9. The optical apparatus of claim 8, wherein the active material comprises an electrically-conducting liquid and an electrically-insulating liquid, wherein when controlling the active material, a curvature of a meniscus of the active material in the active optical element is controlled to produce a given optical power, the meniscus being a liquid-liquid interface between the electrically-conducting liquid and the electrically-insulating liquid.

10. The optical apparatus of claim 8, wherein the active material is a liquid crystal material, wherein when controlling the active material, an alignment of liquid crystal molecules of the liquid crystal material is controlled to adjust a refractive index of the liquid crystal material in the active optical element, thereby producing a given optical power.

11. The optical apparatus of claim 8, wherein the active material is a fluid whose refractive index matches a refractive index of at least one of: the first substrate, the second substrate, and wherein when controlling the active material, an amount of the fluid in the active optical element is varied, thereby producing a given optical power.

12. The optical apparatus of claim 1, wherein the active optical element is implemented as a refractive lens.

13. The optical apparatus of claim 1, further comprising a passive optical element per eye, arranged on an optical path of the active optical element, the passive optical element having a fixed optical power, wherein the fixed optical power of the passive optical element is combined with the predefined optical power to produce a combined optical power.

14. The optical apparatus of claim 13, wherein the passive optical element is implemented as any one of: the first substrate, the second substrate.

15. A method for manufacturing an optical apparatus, the method comprising:
   employing means for determining an optical depth at which a user is looking;
   employing an active optical element formed by encasing an active material between at least a first substrate and a second substrate, the first substrate and the second substrate being optically transparent;
   employing controlling means for controlling the active material in the active optical element to generate one or more optical powers; and
   configuring a processor to:
      process data, collected by the means for determining, to determine the optical depth at which the user is looking;
      detect when the optical depth at which the user is looking is greater than a predefined optical depth; and
      when it is detected that the optical depth is greater than the predefined optical depth, generate a drive signal to drive the controlling means to control the active material in a portion of the active optical element through which the user is looking to produce a predefined negative optical power based on a distance-vison optical power prescribed for the user; and at the same time, generate another drive signal to drive the controlling means to control the active material in a remainder of the active optical element to produce a base optical power.

16. The method of claim 15, wherein the means for determining comprises eye-tracking means, the data comprising eye-tracking data collected by the eye-tracking means, wherein the step of configuring the processor to process the data to determine the optical depth comprises configuring the processor to:

process the eye-tracking data to determine gaze directions of the user's eyes; and determine the optical depth at which the user is looking, based on a convergence of the gaze directions of the user's eyes.

17. The method of claim 15, wherein the means for determining comprises at least one depth sensor, the data comprising sensor data collected by the at least one depth sensor, wherein the step of configuring the processor to process the data to determine the optical depth comprises configuring the processor to:

process the sensor data to generate depth information of a real-world scene being seen by the user; and determine the optical depth at which the user is looking, based on the depth information of the real-world scene.

18. The method of claim 15, further comprising configuring the processor to select the predefined optical power, from amongst a plurality of predefined optical powers, based on the optical depth at which the user is looking.

19. The method of claim 15, wherein the portion of the active optical element at which the predefined optical power is produced is a central portion of the active optical element.

20. The method of claim 15, further comprising configuring the processor to determine the portion of the active optical element at which the predefined optical power is to be produced, based on a gaze direction of a given eye in front of which said active optical element is worn.

21. The method of claim 15, wherein the controlling means is employed to control at least one of: a curvature of a meniscus, a refractive index, an amount of the active material.

22. The method of claim 15, wherein the controlling means comprises:

at least one first electrode deposited on the first substrate and disposed between the first substrate and the active material; and a plurality of second electrodes deposited on the second substrate and disposed between the second substrate and the active material, wherein the at least one first electrode and the plurality of second electrodes are optically transparent.

23. The method of claim 22, wherein the active material comprises an electrically-conducting liquid and an electrically-insulating liquid, wherein when controlling the active material, a curvature of a meniscus of the active material in the active optical element is controlled to produce a given optical power, the meniscus being a liquid-liquid interface between the electrically-conducting liquid and the electrically-insulating liquid.

24. The method of claim 22, wherein the active material is a liquid crystal material, wherein when controlling the active material, an alignment of liquid crystal molecules of the liquid crystal material is controlled to adjust a refractive index of the liquid crystal material in the active optical element, thereby producing a given optical power.

25. The method of claim 22, wherein the active material is a fluid whose refractive index matches a refractive index of at least one of: the first substrate, the second substrate, and wherein when controlling the active material, an amount of the fluid in the active optical element is varied, thereby producing a given optical power.

26. The method of claim 15, wherein the active optical element is implemented as a refractive lens.

27. The method of claim 15, further comprising employing a passive optical element per eye, arranged on an optical path of the active optical element, the passive optical element having a fixed optical power, wherein the fixed optical power of the passive optical element is combined with the predefined optical power to produce a combined optical power.

28. The method of claim 27, wherein the passive optical element is implemented as any one of: the first substrate, the second substrate.

* * * * *